United States Patent [19]

Crosby

[11] 4,107,661
[45] Aug. 15, 1978

[54] ELECTROOPTIC METER POINTER POSITION DETECTOR

[75] Inventor: Robert J. Crosby, Cleveland, Ohio

[73] Assignee: Horizons Incorporated a division of Horizons Research Incorporated, Cleveland, Ohio

[21] Appl. No.: 715,068

[22] Filed: Aug. 17, 1976

Related U.S. Application Data

[63] Continuation-in-part of Ser. No. 620,751, Oct. 8, 1975, abandoned.

[51] Int. Cl.² ............................................. G08B 21/00
[52] U.S. Cl. ..................................... 340/688; 250/215
[58] Field of Search ................... 340/266; 250/222 R, 250/215, 578, 230

[56] References Cited

U.S. PATENT DOCUMENTS

| 2,282,198 | 5/1942 | Murcek | 340/266 |
| 3,363,148 | 1/1968 | Freeman | 340/266 |
| 3,903,422 | 9/1975 | Buhrer | 250/578 |

OTHER PUBLICATIONS

General Transistor Corp., PNP Phototransistors, New York, 1960.

Primary Examiner—Glen R. Swann, III
Attorney, Agent, or Firm—Lawrence I. Field

[57] ABSTRACT

A device is provided for a meter having an indicator, e.g. a pointer, and which detects the presence or absence of the meter pointer at one or more set points or between two set points. The device does not alter the operation of the meter and may be coupled to an alarm or other signal, or it may be used to actuate a mechanism under control of the meter. The device comprises at least one light-emitting diode which produces radiation which falls on a specific area of the meter face and on the meter pointer (if it is within that area) and is reflected from the meter face (and the pointer) to a phototransistor or other suitable receiver which "reads" the signal produced by the radiation reflected from the meter face and the pointer, if present in the area read. The device is mounted so that it can be moved to any desired area of the meter face. Preferably the device is mounted externally to the meter. However, it may be enclosed within the usual meter housing, without altering the operation of the meter.

11 Claims, 23 Drawing Figures

FIG. 5.
A+B Response

FIG. 6.
A−B Response

ELECTROOPTIC METER POINTER POSITION DETECTOR

CROSS-REFERENCE TO RELATED APPLICATIONS

This application is a continuation-in-part of U.S. Pat. Application Ser. No. 620,751 filed Oct. 8, 1975, now abandoned.

STATEMENT OF INVENTION AND OBJECTS

This invention relates to means for detecting the presence or absence of a meter pointer at a specified meter scale location. More specifically, it relates to means for detecting the presence or absence of a meter pointer at a specified meter scale location, said means being mounted on a meter in such a way that it does not affect the movement of the meter pointer or the functioning of the meter.

One object of the invention is to provide means for detecting the presence or absence of a meter pointer at one or more selected set points or between two such points, on a meter.

Another object of the invention is to provide an upper and/or lower limit alarm for conditions represented on the meter.

A further object of the invention is to provide means which give an indication of the location of the meter pointer and its deviation from one or more designated set points on the meter.

Still another object of the invention is to provide means which convert a meter to a controller for monitoring an apparatus or process.

Another object of the invention is to provide an in or out of limits (sensing span) alarm.

A further objective of the invention is to provide means which give an indication of the deviation and direction of motion of the meter pointer relative to the set point.

Still another objective of the invention is to provide the means to convert a meter to a proportional controlling mechanism.

BRIEF DESCRIPTION OF THE DRAWINGS

These and other objects will become apparent or will be pointed out in the description which follows taken in conjunction with the drawings in which.

DETAILED DESCRIPTION OF THE INVENTION

Figures 1, 2:
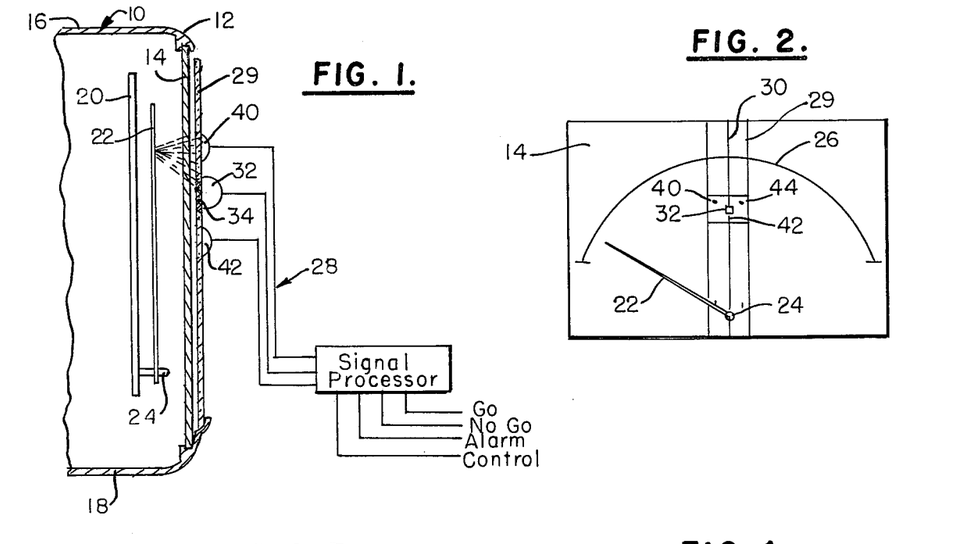
FIG. 1 is a schematic fragmentary view of a meter to which the invention has been applied externally as seen from one side.
FIG. 2 is a schematic view of the meter of FIG. 1 as seen from the front.
Figure 11:
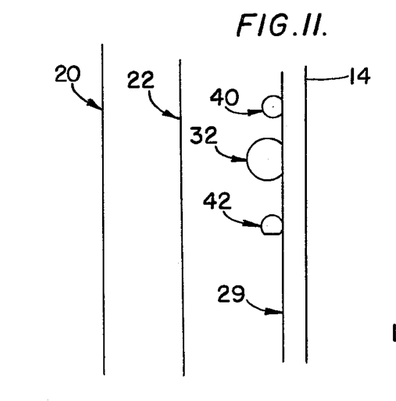
FIG. 11 is a view like FIG. 10 showing the device enclosed within a meter housing.

As best seen in FIGS. 1 and 2 the meter 10 to which the invention has been applied includes a housing 12 having a front face 14, a top side 16, and a bottom side 18. Within the housing 12 there are a meter face 20 and a meter pointer 22 supported by means 24 which permit the pointer 22 to traverse the meter face in the usual way. The meter may include a meter scale 26 on meter face 20. The internal meter construction is not altered in any way by the application of this invention to either the exterior of the meter as shown in FIG. 1, or to the interior of the meter, as shown in FIG. 11. The apparatus of this invention is preferably enclosed in a case (not shown) in order to protect the components from dust and moisture in the ambient atmosphere.

As seen in FIGS. 1 and 2, the constituents of the electrooptic meter pointer position detector 28 are positioned adjacent to the front face 14 of the meter and consist of components mounted independently of the meter and connected electrically to means to actuate the components. Preferably these components are mounted on a clear plastic strip or panel 29 which is positioned adjacent to the front face 14 of the meter housing either directly on the front face or spaced a small distance from the front face of the meter either inside the meter housing 12 or outside of the meter housing. Preferably panel 29 is mounted so that it can be pivoted about a pin so that the detector 28 can overlay any desired portion of the meter face or if the meter pointer traverses the face, the panel 29 can be mounted to move along the face in the same way. In a preferred construction, panel 29 is a clear plastic strip and may be rectangular as shown in FIG. 2 or panel 29 may have a sector shape (not shown).

Figure 9:
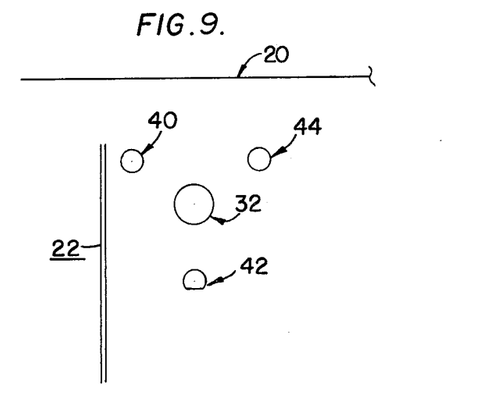

FIGS. 2 and 9 are views looking toward the front face 14 of meter 10. In FIG. 2 the "set position" of the pointer 22 is shown as a vertical line 30. A phototransistor 32 is positioned at some convenient location along line 30 in the plane passing through the "set position" of the pointer and perpendicular to the face of meter 10. Of course, the set point need not be on a vertical line extending up from the pivot 24. It could be at either end of the meter scale or at some intermediate location or any other desired location along the scale. Phototransistor 32 is preferably spaced from mounting panel 29 by a filter 34 provided to reduce the amount of stray light reaching the phototransistor 32 from sources other than the light emitting diode(s) used to detect the position of the pointer 22. Panel 29 itself may serve as the filter if it is made of an appropriate material.

Panel 29 of the meter position detector 28 supports one or more light emitting diodes depending on the mode in which it is to operate. In one mode, a single light emitting diode 40 is utilized and pulsed radiation from the diode is reflected from the meter face (and pointer) and falls on phototransistor 32 which produces a signal as hereinafter described. In a second mode two light emitting diodes 40 and 44 provide pulsed radiation which is reflected from the meter face and is received by the photoreceptor 32. In a third mode of operation three light emitting diodes are utilized, a reference light emitting diode 42 being added to light emitting diodes 40 and 44. In FIGS. 8–11 the relative positions of these components are shown schematically.

In one embodiment of the invention, the light emitting diodes are pulsed by pulse generators. Any suitable means may be employed, free running, low duty cycle multivibrators are one such means. The phototransistor generates an output, based on the radiation it receives from the light emitting diodes, the output being a combined signal which is fed to a differential voltage amplifier in the manner hereinafter described.

Figure 3:
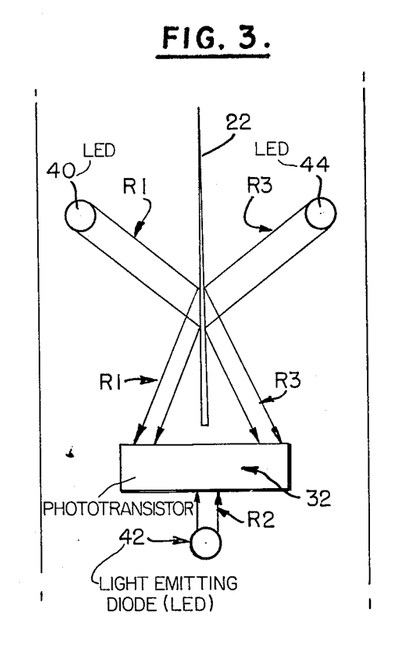
FIG. 3 is a fragmentary schematic view of the device of FIGS. 1 and 2 on a greatly enlarged scale, showing the pointer at one set point.

FIG. 3 is a schematic representation of the device showing radiation $R_1$ from light emitting diode 40 falling on pointer 22 and being reflected to phototransistor 32. Also shown is radiation $R_3$ from light emitting diode 44 reflected from pointer 22 to phototransistor 32. Radiation from a third emitting diode 42 is shown as rays $R_2$ and falls directly on the phototransistor.

Figure 4:
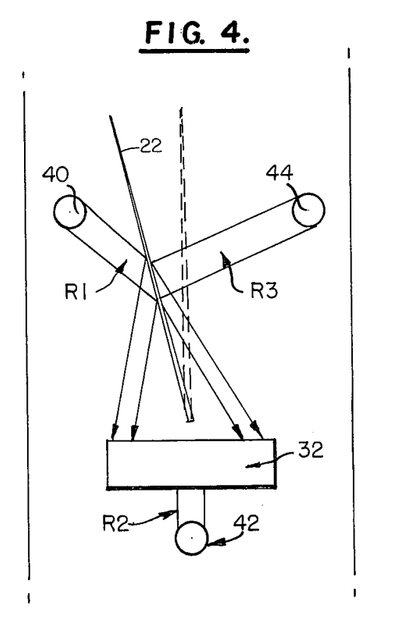
FIG. 4 is a view similar to FIG. 3 showing the pointer displaced from the set point shown in FIG. 3.

FIG. 4 is a similar view showing the pointer in a different position and the change in the manner in which radiations $R_1$ and $R_3$ are altered by the shift in position of pointer 22.

More than one set point could be placed on a meter providing high and low limit, alarm functions and sequential control operation.

The device of this invention may be operated as a simple pointer detector only. By the use of light emitting diode 40 alone or with diode 42, the device tests for the presence or absence of a meter pointer at a particular point. In operation with two light emitting diodes, they are pulsed on and off alternately. The resulting signal out of phototranssistor 32 is $(R_1 + R_L)$ and alternately $(R_2 + R_L)$ in which $R_1$ is reflected light from light emitting diode 40, $R_2$ is light from light emitting diode 42 and $R_L$ is reflected from room light. Since $(R_1 + R_L) - (R_2 + R_L) = (R_1 - R_2)$ any reflection from the room light is cancelled out. By suitable means $R_1$ can be made equal to $R_2$ in the absence of a pointer. Then the difference $R_1 - R_2 = 0$, and the circuit is at a null until the pointer approaches the set point and changes $R_1$.

FIG. 4 is similar to FIG. 3 and has a third light emitting diode 44 the presence of which enables the circuits to tell whether the pointer is above or below the set point and by how much. In this embodiment light emitting diodes 40, 42 and 44 are consecutively pulsed on and off resulting in an output from the phototransistor 32 of $(R_1 + R_L)$, $(R_3 + R_L)$ and $(R_2 + R_L)$. By comparing $(R_2 + R_L)$ with a known reference of $R_2$, $R_L$ is determined. Taking $(R_1+R_L)-R_L$ and $(R_3+R_L)-R_L$ leaves $R_1$ and $R_3$ signals. Using $R_1 - R_3$ for a black pointer (FIG. 6) the output is negative for a below but near the set point indication, positive for an above but near set point indication, and zero at the set point. Comparing the signal from $R_1$ with a null from the comparator determines if the pointer is at the set point or remote from the set point. The amplitude of the positive or negative output of the first comparator determines the amount of deviation from the set point.

Figure 5:
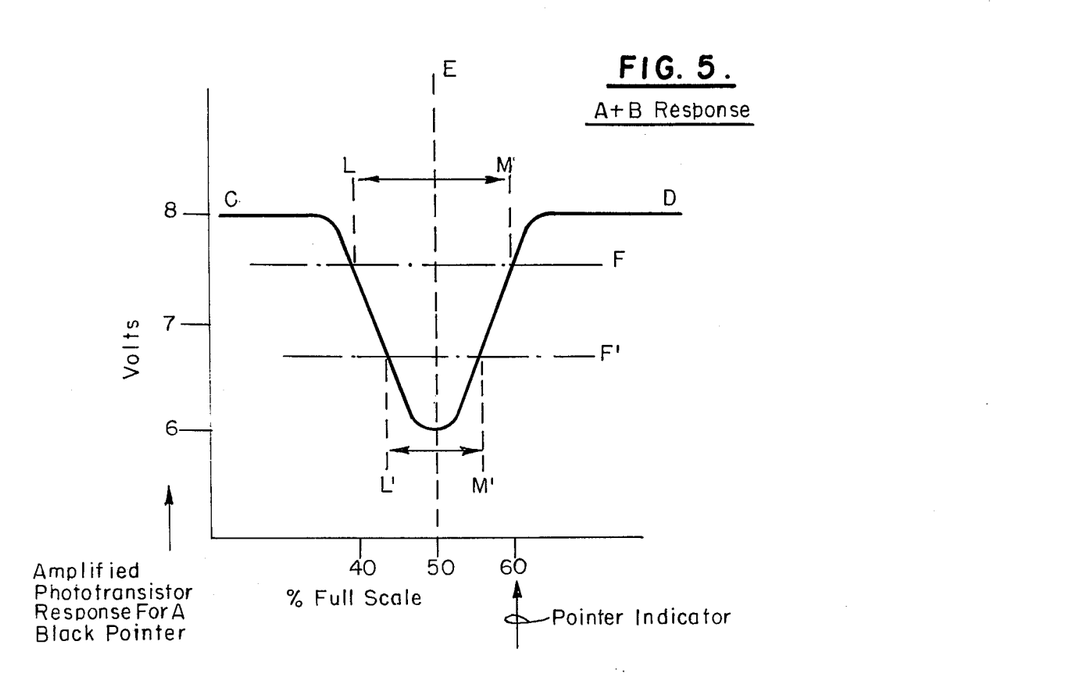
FIGS. 5, 6 and 7 are schematic representations depicting the response or output of the device in various embodiments as a meter pointer traverses a meter face.

FIG. 5 depicts the output of the phototransistor as the pointer moves across the face of the meter. The phototransistor "sees" the information in FIG. 5. The ordinate represents the output voltage and the abcissa represents the scale on the meter face. Line "CD" represents the output of the phototransistor 32 as it received the reflection of the light pulsed by either a single diode 40 or by two diodes 40 and 44. With no pointer in the field, line "CD" is a straight line and the reflection is constant. As the meter pointer moves into the region illuminated by diodes 40 and 44 the reflection to the phototransistor is decreased by the presence of the black pointer. As indicated in FIG. 5 the output of the phototransistor is reduced as a black pointer (white dial) approaches set point "E" from either direction. When line "CD" crosses line "F" an alarm could be tripped or some other signal can be given or another apparatus could be actuated, according to the intended use of the meter minder. The sensing span (L⇌M) can be set at any desired value, so that whenever the pointer is outside the selected span such action is effected. This arrangement does not know if the pointer is upscale or downscale. The (A + B) response (FIG. 5) refers to the algebraic sum of reflected light from one or two light emitting diodes mounted on one side (or both sides) of the set point with (A + B) equal to (A + 0) for a single diode 40 and (A + B) equal to the response of a pair of diodes, 40 and 44.

Figure 6:
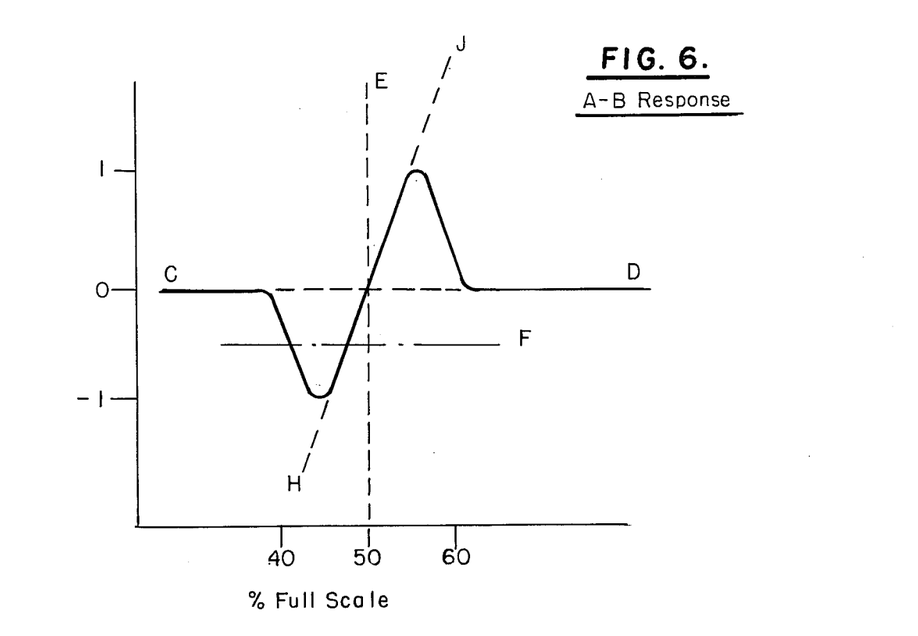

FIG. 6 shows the (A - B) or algebraic difference between the reflected light from light emitting diodes 40 and 44 mounted on either side of the set point. In this arrangement the phototransistor and an operator know from which direction the pointer is approaching the set point.

The light emitting diodes 40 and 44 are continuously pulsed on and off in order to obtain the responses depicted in both FIGS. 5 and 6.

Stated in somewhat different terms, FIGS. 5 and 6 show the A + B ($R_1 + R_3$) and A - B ($R_1 - R_3$) response of FIGS. 3 and 4 and 12 and 14. As seen in FIG. 5 the reflectance off a white meter face is maximum and constant in the absence of a black pointer. Line "CD" represents the sum of $R_1$ and $R_3$ of FIG. 4 as pointer 22 traverses the meter scale from left to right. As pointer 22 approaches light emitting diode 40 from the left, the reflection $R_1$ starts to decrease along line "CD". As the pointer 22 moves more toward the right, its presence reduces both $R_1$ and $R_3$ in varying amounts schematically indicated by the decrease in the value of line "CD". When the pointer 22 reaches the mid-point between light emitting diodes 40 and 44, as indicated in FIG. 3, the lowest value of reflection is obtained as indicated by the intersection or ordinate "E" with curve "CD" in FIG. 5. As the pointer continues to move to the right the amount of reflection increases symmetrically to the way it decreased. In FIG. 5 the control point is defined by the intersection of line "F" with line "CD". Since line "F" intersects line "CD" twice, at all points except the minimum in "CD", a sensing span is established as indicated by line "LM". The control span is electrically adjustable, for example by means of a voltage divider positioning line "F" continuously along "E".

Figure 14:
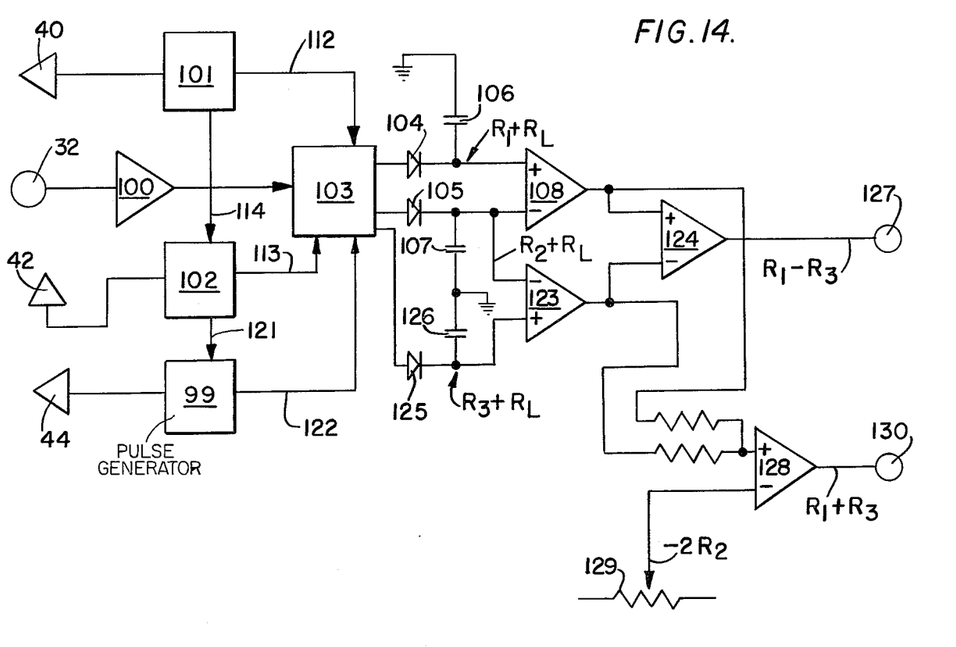

FIG. 6 also depicts the output of the phototransistor for the light emitting diodes shown in FIGS. 3, and 14. Line "CD" in FIG. 6 represents the difference of the reflected radiations. Again as the pointer 22 moves from left to right in FIG. 4 it first effects a reduction in $R_1$ as indicated by the dip in line "CD". When the pointer reaches the center between the light emitting diodes as in FIG. 3, $R_1$ and $R_3$ are attenuated by the same amount resulting in an A - B response equal to 0, as indicated by line "E" intersecting line "CD" at 0 in FIG. 6. As the pointer moves further to the right $R_3$ is reduced and $R_1$ returns to normal. This is indicated by the peak $(-R_3)$ in FIG. 6 on line "CD".

Figure 7:
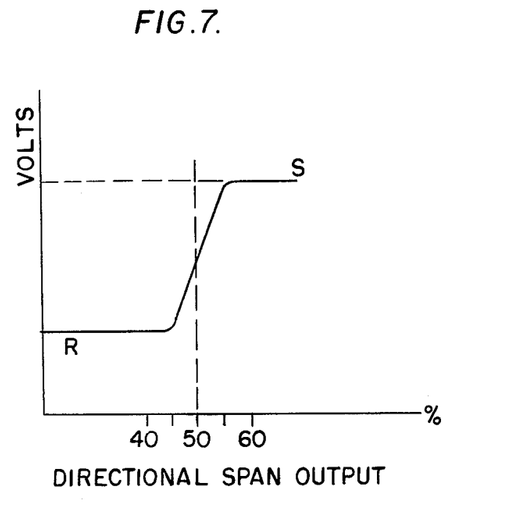

FIG. 7 depicts still another form of output in which the output is modified by a signal (voltage) which permits the operator to know the direction in which the meter pointer is moving, i.e. it converts the output shown in FIG. 6 to an output in which the signal becomes either +1 or −1 volts depending on which way the pointer is moving.

Figure 8:
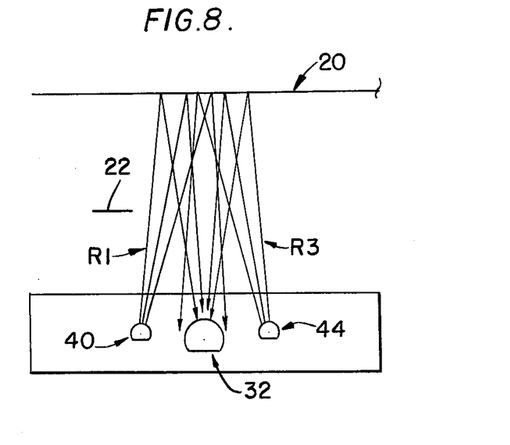
FIGS. 8, 9 and 10 are fragmentary elevations of the invention applied to a meter as seen from the top, front and side respectively.

FIG. 8 is another view showing schematically the radiation $R_1$ from light emitting diode 40 falling on meter face 20 and being reflected from the meter face onto phototransistor 32 and the radiation $R_3$ from light emitting diode 44 falling on meter face 20 and reflected from the meter face onto the phototransistor.

Figure 10:
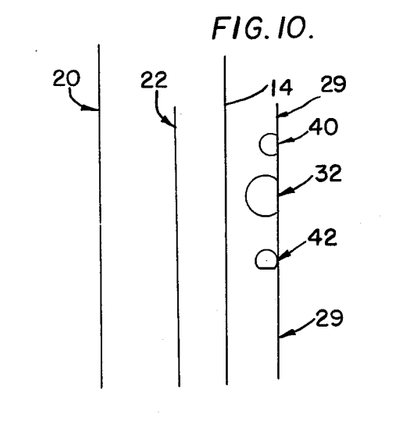

FIGS. 9 and 10 are schematic views of the meter of FIG. 8 as seen from the front and the side.

FIG. 11 is a view similar to FIG. 10 except that the device is mounted internally within the housing of the meter, while in FIGS. 8, 9 and 10 the device is mounted externally of the meter.

Figure 12:
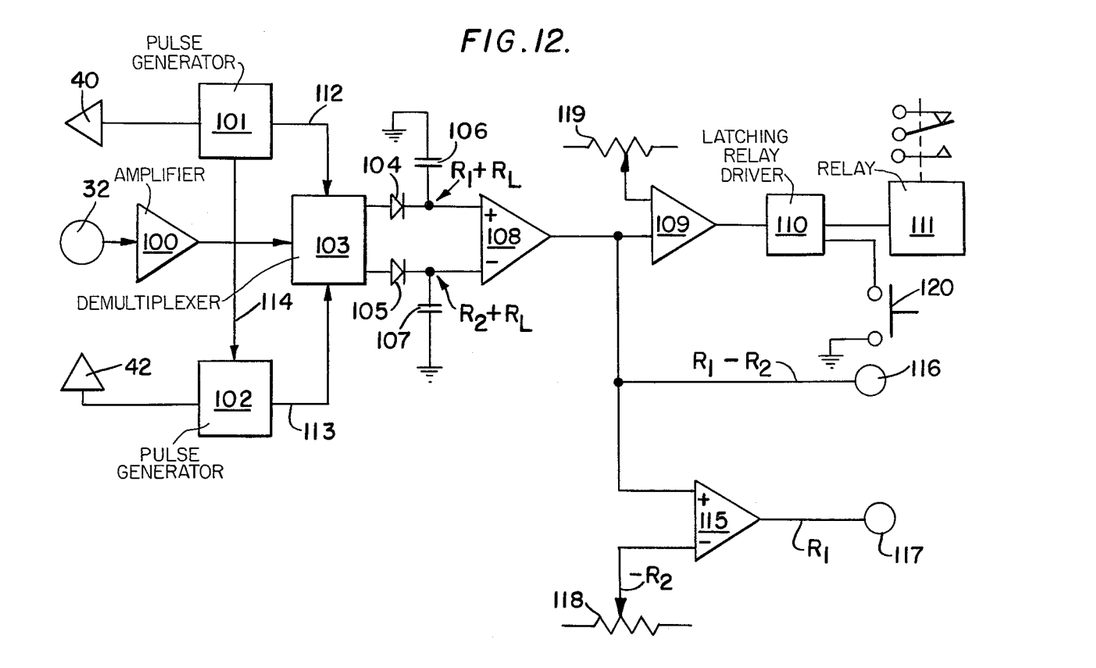
FIGS. 12–14 are views showing the circuitry for various embodiments of the invention.

FIG. 12 shows the circuitry for operation with two light emitting diodes 40 and 42, one of which is pulsed to illuminate the meter face and the other of which is for reference purposes and is pulsed to illuminate the phototransistor 32 directly. The apparatus includes pulse generators 101 and 102 which energize light emitting diodes 40 and 42 respectively, one at a time, this being accomplished by synchronizing means 114. The illumination $R_1$ from diode 40 reflected from the meter face returns to phototransistor 32, and includes the room light $R_L$ which is present; and the illumination from diode 42 falls directly on the phototransistor 32.

As a result of the illumination received by phototransistor 32 an output voltage is generated which is received by an amplifier 100 connected to phototransistor 32.

The output signal from amplifier 100 is passed through the demultiplexer 103 which is synchronized by synchronizer means 112, 113 on to peak detectors (104,106) and (105,107) which charge up to DC levels corresponding to the peak phototransistor output from its respective light emitting diode, one signal being $R_1 + R_L$ and the other being $R_2 + R_L$, wherein $R_1$, $R_2$ and $R_L$ are as previously defined in connection with FIGS. 2–6.

A differential amplifier 108 is connected to demultiplexer 103 from which it receives the two signals and amplifies the difference between them and cancels out any signal common to the two outputs. In this instance it cancels out the room light $R_L$. The output of differential amplifier 108 can be utilized in any of several ways depending on the use to which the output is to be applied.

For example the output of a differential amplifier 108 which is the difference between the reflected radiation from light emitting diode 40 and light emitting diode 42 can be compared to a reference voltage 118 or 119 by means of a voltage comparator 109 or by means of a differential amplifier 115. If the signal is slightly smaller than the reference voltage 119, a latching relay driver 110 can be activated which in turn activates a relay 111. The relay can close a circuit to an alarm or other signal or it can actuate a piece of equipment.

In the case in which reference voltage 118 is made equal to $-R_2$ and the output of differential amplifier 108 is connected to differential amplifier 115 the resulting output of differential amplifier 115 will be proportional only to the reflected radiation $R_1$ from light emitting diode 40, with the ambient $R_L$ (room light) removed therefrom. The output 117 of differential amplifier 115 is the sum shown in FIG. 5. The output 116 of differential amplifier 108 is the sum shown in FIG. 5 with a constant offset equal to the value of $R_2$.

Figure 13:
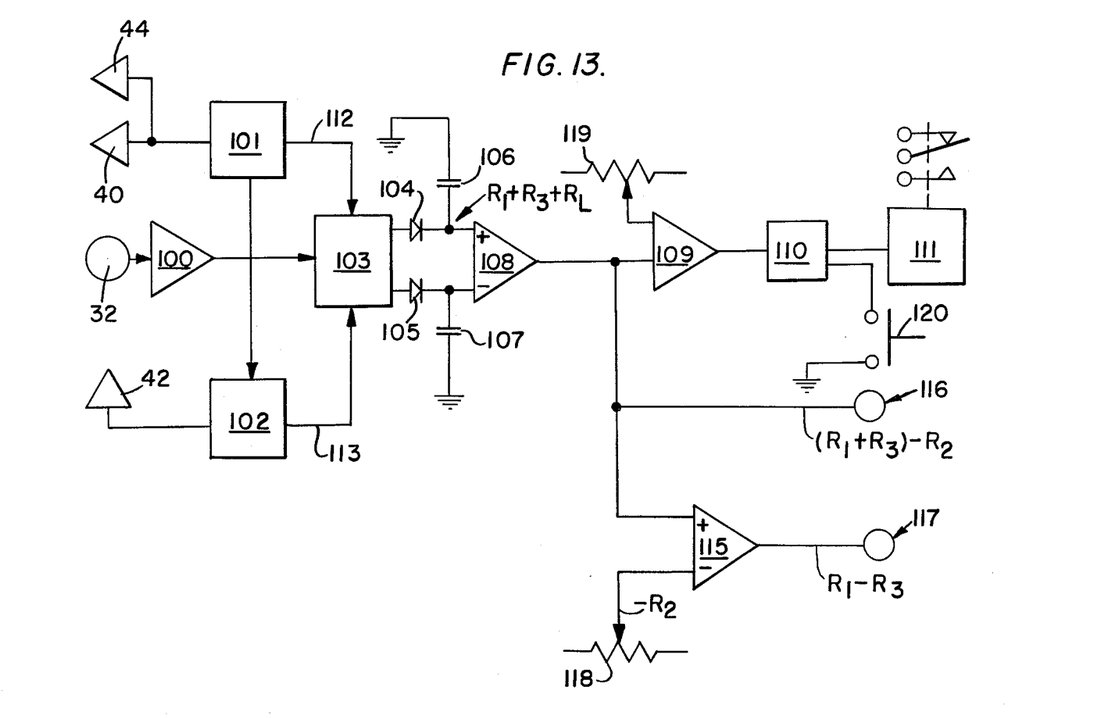

FIG. 13 is similar to FIG. 12 except that an additional light emitting diode 44 has been added as shown in FIGS. 8–10. With light emitting diodes 40 and 44 on opposite sides of the phototransistor 32 a more sharply defined control point is obtained. In operation light emitting diodes 40 and 44 are pulsed on by pulse generator 101 at the same time and alternated with light emitting diode 42 which is pulsed by pulse generator 102 as in FIG. 12. The output signal of differential amplifier 115 is the sum shown in FIG. 5.

FIG. 14 shows a further modification of the invention in which the light emitting diodes 40, 42 and 44 are pulsed in a synchronized sequence to cause radiations $R_1$, $R_2$ and $R_3$ respectively to fall on phototransistor 32 as previously described. The phototransistor is connected to an amplifier 100 which receives an output (voltage) signal from phototransistor 32. Amplifier 100 is connected to demultiplexer 103 which is also connected to each of the pulse generators 99, 101 and 102 by synchronizing means 112, 113 and 122 which enables the demultiplexer in proper synchronous relationship. The outputs of the demultiplexer 103 are $R_1 + R_L$, $R_2 + R_L$ and $R_3 + R_L$. The demultiplexer outputs are received by peak detectors 104, 106 and 105, 107 and 125, 126 each connected to the demultiplexer. These are connected to differential amplifiers 108 and 123 which produce an output of $R_1 - R_2$ and $R_3 - R_2$ respectively (the $R_L$ portion of the input signals cancelling out, by difference).

Differential amplifiers 108 and 123 are connected to a differential amplifier 124 to produce an output 127 ($R_1 - R_3$) corresponding to FIG. 6. An output 130 proportional to $R_1 + R_3$ (FIG. 5) is available by feeding the outputs from amplifiers 108 and 123 into differential amplifier 128 and connecting the amplifier 128 to a reference voltage 129 equal to $-2R_2$.

Figure 15:
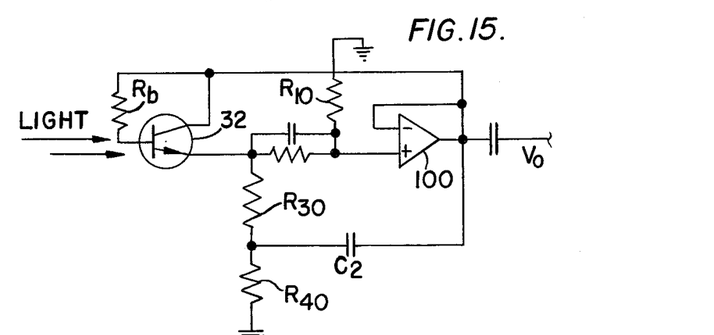
FIGS. 15 and 16 show one bootstrap circuit useful in the embodiments shown in FIGS. 17–21.
Figure 16:
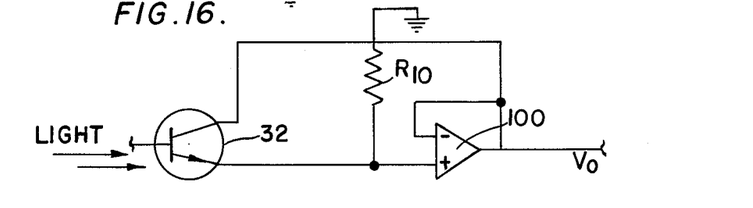

FIGS. 15 and 16 show a bootstrap amplifier which may be used with the present invention. The AC sensitivity of the phototransistor 32 and amplifier 100 is improved several orders of magnitude by using positive feedback in a bootstrap circuit. This positive feedback causes the effective base load resistance $R_b$ of the phototransistor and $R_{30}$ to approach infinity as the voltage feedback approaches a gain of one. An input impedance of 100 megohms is easily obtained by AC. The input impedance to DC might be 40 kilohms. The photocurrent of a phototransistor is bled off by the base resistance. The higher the base resistance the more useful photocurrent out of the phototransistor. Coupling this higher output current into a higher amplifier input impedance (AC) produces a much larger voltage signal. This bootstrap approach improves the AC response relative to ambient variations (DC and low frequency AC) by at least a factor of 1,000. For example, a 60 watt incandescent light in near proximity and aimed at a meter with a sensor mounted on it has no effect, yet an 18 volt peak-to-peak output is easily obtainable from meter reflections caused by the light emitting diodes.

The effective impedance of a resistor is given by $$\frac{(V_a)R}{V_a - V_b}$$

where R is the resistance and $V_a$ and $V_b$ are the voltages at either end of the resistor.

If $V_b = 0.9 V_a$, the effective resistance, $R_{eff} = 10R$

If $V_b = 0.999 V_a$, $R_{eff} = 1000R$, as $V_b \to V_a$, $R_{eff} \to \infty$. The described bootstrap circuit can be made to exhibit a broad band or narrow band frequency selectively by proper selection of the resistors and capacitors. The circuit is stable because of the low amplifier gain involved. FIG. 16 schematically shows the AC equivalent of FIG. 15.

Figure 17:
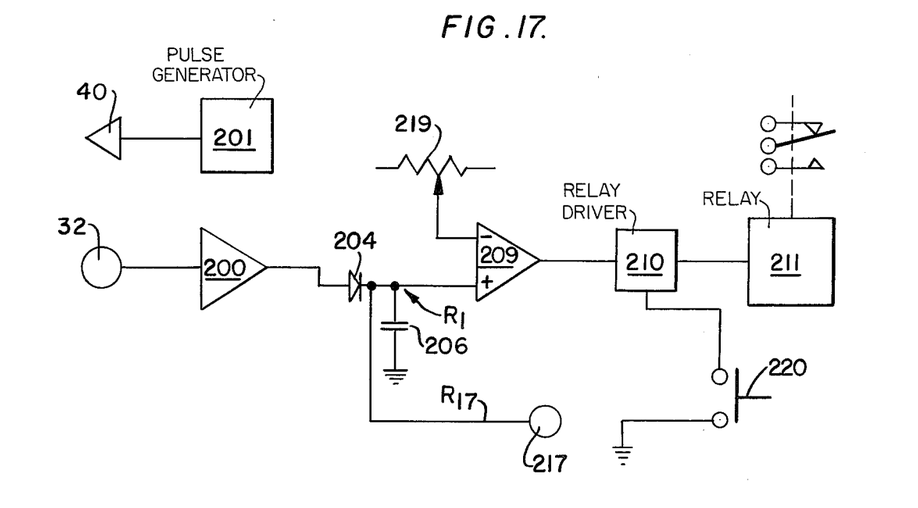
FIGS. 17–23 are views showing the circuitry of further embodiments of the invention.

In the embodiment shown in FIG. 17, a pulse generator 201 is connected so as to pulse light emitting diode 40 whose radiation $R_1'$ is reflected back from the meter face as $R_1$ and falls onto phototransistor 32 which is connected to the bootstrap circuit shown in FIG. 16 and here designated 200. The output from the bootstrap circuit 200 shown in FIG. 16 is proportional to $R_1$ and hence indicative of the meter pointer position. Peak detector 204,206 charge to the peak voltage of the output of amplifier 200. This DC level can be taken as a porportional signal at point 217 or fed to a voltage comparator 209 which compares the signal with a reference voltage 219 and activates a relay driver 210 and relay 211 if the voltage on peak detector 206 is below reference voltage 219. The relay driver is provided with a reset switch 220.

Figure 18:
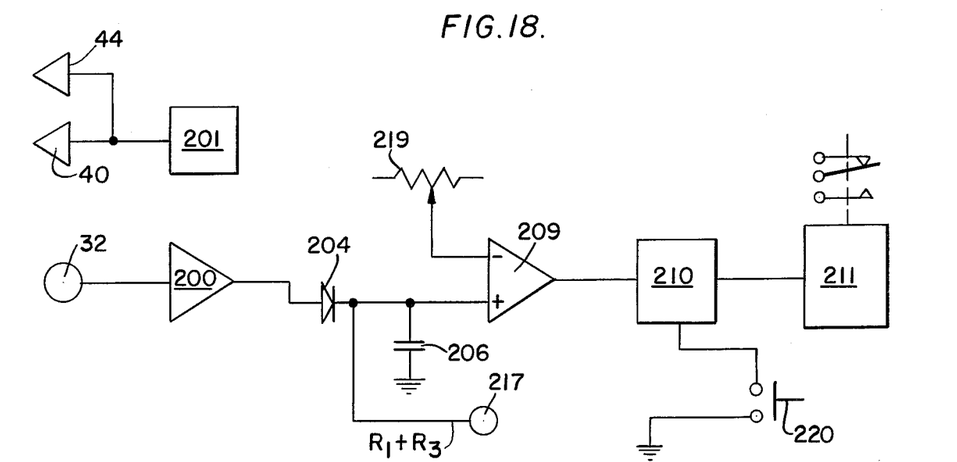

The circuit of FIG. 18 is similar to that of FIG. 17 except for the use of two light emitters, light emitting diodes 40 and 44. The output of bootstrap amplifier 200 is the sum of ($R_1$ and $R_3$). This produces a sharper dip in the curve of FIG. 5 and a more sharply defined control point.

Figure 19:
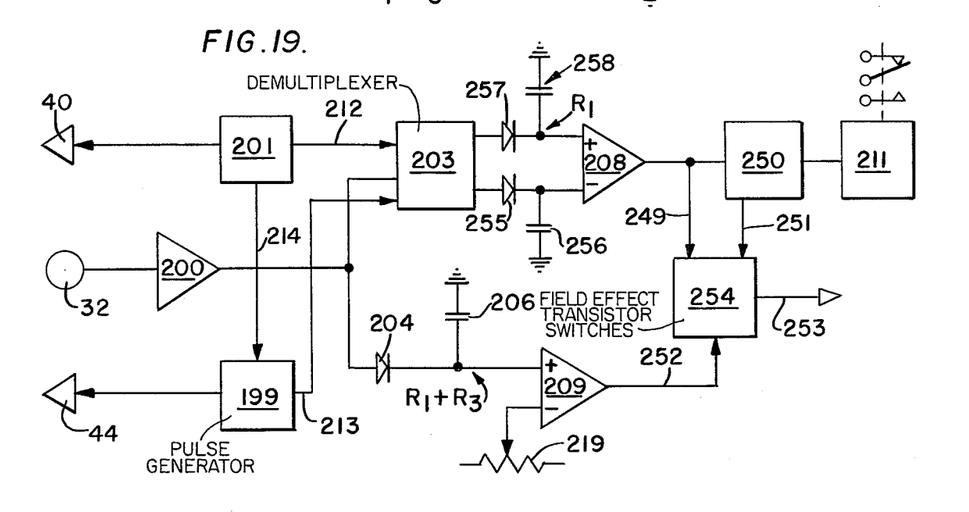

In the embodiment shown in FIG. 19 two pulse generators 201 and 199 are connected to produce alternate pulses of radiation which alternate from light emitting diodes 40 and 44, which are activated only one at a time. Phototransistor 32 alternately "sees" $R_1$ or $R_3$ (reflected light from light emitting diode 40 or 44). Demultiplexer 203 synchronized by means 212 and 213 activates the output channel corresponding to the active light emitting diode. Peak detector circuits 257, 258 and 255, 256 charge up to peak values corresponding to the peak values of $R_1$ and $R_3$. Differential amplifier 208 amplifies the difference between $R_1$ and $R_3$ and produces an output such as shown in FIG. 6. This output can be fed to a Schmidt trigger 250 which, because of its hysterysis, can latch and release on the respective positive and negative peaks as shown in FIG. 6. The Schmidt trigger can drive a relay with an output corresponding to ON (above) - OFF (below) set point operation. The output of the bootstrap amplifier 200 can also be fed to peak detector 204, 206 connected to voltage comparator 209 whose output is high until ($R_1 + R_3$) is less than a reference voltage 219 when the output drops low. By feeding this output 252 to some field effect transistor switches 254, a composite output 253 such as that shown in FIG. 7 is obtainable. Near the set point, the ouput as shown in FIG. 6, i.e. line 249, away from the set point the output is line 251—high above the set point, low below the set point (see FIG. 7).

Figure 20:
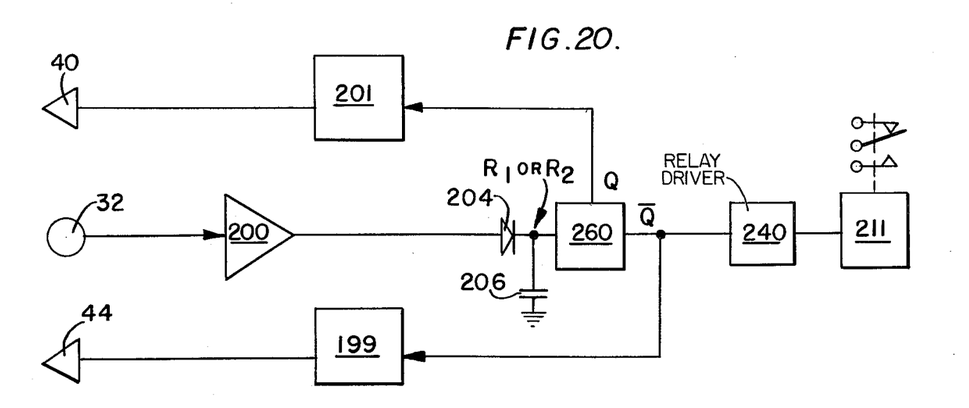

FIG. 20 illustrates another circuit utilizing two pulse generators 199 and 201 and two light emitting diodes 40 and 44. One light emitting diode 44 is operated until the light beam $R_3$ is interrupted, for example by movement of the pointer across the set point, at which time light emitting diode 44 is turned off and light emitting diode 40 is turned on. When $R_1$ is interrupted light emitting diode 40 is turned off and light emitting diode 44 is turned on and so on. As shown in FIG. 20, the output of the bootstrap amplifier 200 is fed to a peak detector 204, 206 which in turn feeds a flip-flop 260. When the voltage on capacitor 206 drops below a specified value, the flip-flop changes its output to the opposite state which enables the non-active pulse generator. The output of the flip-flop can be fed to a relay driver 240 and drive an output relay 211, or it can be used as a logic level, or it can activate an alarm or a piece of equipment.

Figure 21:
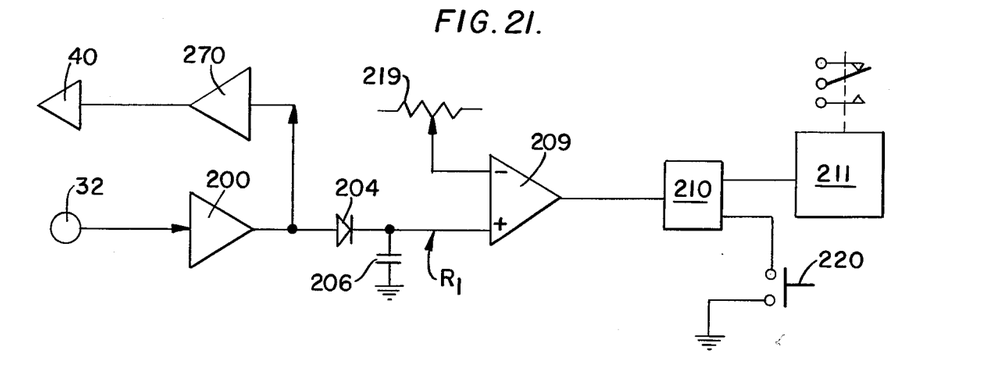

FIG. 21 illustrates a circuit which makes use of positive optical feedback which makes the circuit regenerate when the optical bath is unobscured. In FIG. 21, light emitting diode 40 is controlled by buffer amplifier 270. The reflected radiation from light emitting diode 40 falling on phototransistor 32 produces a signal fed to bootstrap amplifier 200. The output of bootstrap amplifier 200, buffered by buffer amplifier 270, controls the light emitting diode 40, the light emitting diode 40 is turned on harder, causing the circuit to regenerate and oscillate. The output of amplifier 200 is also fed to a peak detector 204, 206 and a voltage comparator 209 to drive a relay 211 through relay driver 210 as previously described. When the reflected radiation received by photo-transistor 32 is interrupted, the oscillation ceases tripping the relay 211. A reset 220 is provided for resetting the relay.

Figure 22:
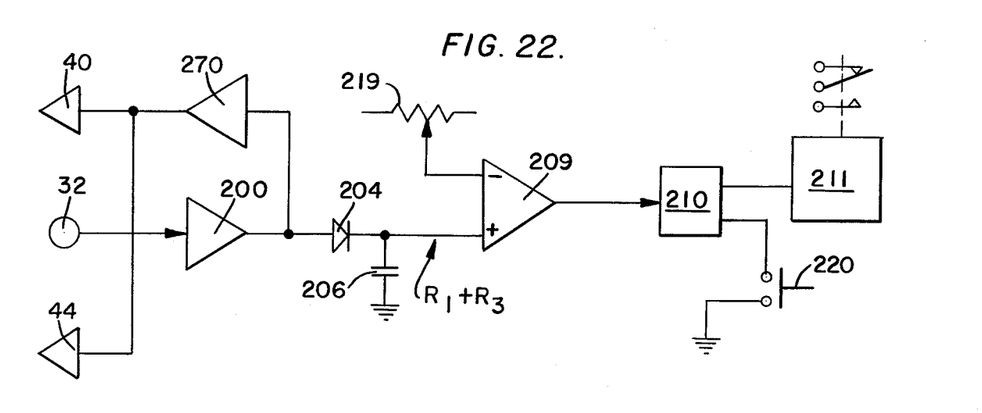

The circuit of FIG. 22 is similar to that shown in FIG. 21 except that two light emitting diodes 40 and 44 are utilized. The circuit operates the same way except it has a more sharply defined control point because $R_1$ and $R_3$ must both be attenuated by the pointer.

Figure 23:
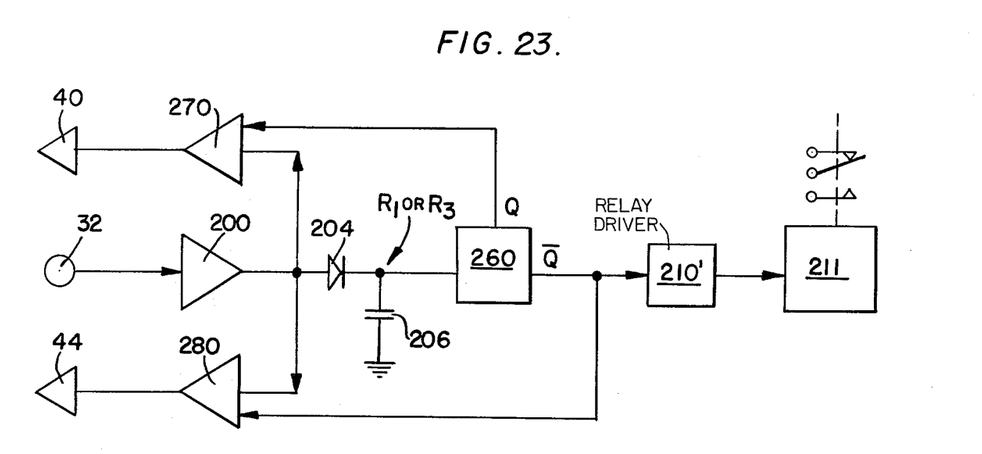

FIG. 23 shows a further embodiment in which regenerative positive optical feedback phototransistor 32, and two light emitting diodes 40 and 44 are utilized to determine the direction of the pointer. The buffered output of bootstrap amplifier 200 powers both light emitting diodes one at a time by means of buffered amplifiers 270 and 280 connected to light emitting diodes 40 and 44 respectively. Light emitting diode 44 is on until the rays $R_3$ are obstructed, at which time light emitting diode 44 is turned off and light emitting diode 40 is turned on. When rays $R_1$ are obstructed, light emitting diode 40 is turned off and light emitting diode 44 is turned on and so forth. The output of the bootstrap amplifier 200 is fed to peak detector 204, 206. When the voltage on capacitor 206 drops below a certain value the flip-flop 260 changes its output to the opposite state which enables the nonactive buffer amplifier and activates the opposite light emitting diode. The flip-flop output can be fed to a relay driver 210' and drive a relay 211 or be used directly for other purposes as previously described.

The operation of the device of this invention is believed to be apparent from the preceding description. In use, light emitting diode 40 is switched on to provide pulses at a high frequency rate, e.g. 1,000 to 100,000 hertz. Using a low (5–10%) duty cycle and overdriving the light emitting diode 40 to 600 to 1000% of maximum rating, the output of light emitting diode 40 is increased to a 3–5 mw pulse. The rays from diode 40 are reflected from both the pointer 22 and the meter face 20. If the meter face is white the reflected radiation will decrease with the presence of a black pointer and will increase with its absence. The response of phototransistor 32 is determined by the total reflection which it receives and hence the presence or absence of the pointer within the portion of the scale which light emitting diode 40 illuminates is detectable.

To determine the location and deviation from set point of the meter, light emitting diode 44 is incorporated in the device as shown in FIG. 14. In this arrangement light emitting diodes 40 and 44 are mounted on either side of the set point and pulsed alternately. With a white pointer the following obtains: when the pointer is at the set point the reflections from both light emitting diodes are equal and if the pointer is not at the set point the two reflections received by photoreceptor 32 differ. The logic (i.e the output) could be used as an alarm or could be included in a feedback loop to control a process about a set point, or to actuate a relay connected to a piece of equipment.

Operation can be improved by using a third light emitting diode 42 to provide a reference level as shown in FIGS. 13 and 14. The reference light emitting diode 42 is set so that the signal representing light from the reference light emitting diode 42 is approximately equal to the reflection from light emitting diode 40. By alternating between the two light emitting diodes 40 and 44, the phototransistor sees two signals each of which includes stray reflections from room light. By suitable processing such as that shown in FIGS. 13 and 14, the reflection from room light cancels out. The logic output is a visible, audible and/or control output of the condition displayed on the meter.

The present invention is a distinct improvement over the known use of photocells in optical meter relays and contactless control systems establishing control points in analog meter systems.

There are several disadvantages inherent in the use of photocells for this purpose, namely:

a. a shutter or vane is usually connected to and rotates with a moving coil and indicating pointer, requiring specific meter design to provide counterbalancing for the weight of the same;

b. photocell units presently available have a variable coincidence error across the meter scale range, thereby imposing a variable limitation on the accuracy of selecting a set point at any given portion of the scale;

c. due to the fact that the photocell is essentially a broad band device, very special shielding is required in meter design to eliminate the perturbing influence of ambient light;

d. due to the high average, constant power requirement of 540 m watts demanded by the lamp and photocell device, battery operation would be impractical;

e. due to the bulky nature of the mechanical assemblies associated with photocell control devices, the usual practice is to limit the number of control points to two per meter;

f. in order to utilize the photocell devices to control a meter monitored process within a sensing span for a given meter, it is necessary to employ two complete control mechanisms; further the minimum sensing span obtainable is limited by the physical dimensions of the two controlling set point mechanisms; and g. response time of photocell is comparatively slow.

By contrast the phototransistor control system described above has the following advantages over a conventional photocell system:

a. can be incorporated into any existing analog meter, dial gauge or float ball flow meter as an outboard unit. Thus, no modification of the existing meter mechanism is required since there is no mechanical, electrical or magnetic coupling with the meter movement;

b. the light emitting diode control unit would have a small constant coincidence error across the meter scale;

c. the light emitting diode phototransistor unit operates with either narrow-band visible or narrow-band IR light emitting diodes. In either case it is not necessary to shield from the effects of stray, ambient light because the phototransistor is employed in a frequency selective mode;

d. the average power requirement of the light emitting diode phototransistor sensing head is 20 m watts or less, hence battery operation is a feasible option;

e. since the light emitting diode phototransistor sensing head is completely solid state, it is necessarily made more compact than the conventional photocell lamp device and it is therefore possible to install multiple set points on any given meter or dial gauge. Up to four set points per meter have been easily installed on a small (three inch) meter;

c. because of the nature of the reflectance pointer position curves (FIGS. 5, 6) only one sensing head is needed to define an adjustable sensing span; and g. response time of phototransistor is fast, 5–100 milliseconds. This enables various signal processing schemes, A + B or A − B to be utilized.

I claim:

1. A system adapted to be used in conjunction with a meter having a pointer and which detects the presence or absence of the pointer at some set point of the region normally traversed by the pointer during the operation of the meter, said system being operative independently of the operation of said meter and not affecting the same, said system comprising in combination: a meter including a meter face, a pointer mounted for movement across said meter face and detecting means including means to detect the presence or absence of said pointer at some set point along the path traversed by said pointer as it traverses said meter face, said detecting means comprising:

at least one and not more than two light emitting diodes positioned adjacent to said meter face and to one side of the set point position of said pointer and intermediate of the ends of said pointer;

a phototransistor positioned adjacent to said meter in a plane which includes a line which defines the set point position of said pointer;

means for pulsing said first light emitting diode so as to cause radiation from said light emitting diode to fall on said meter face and said pointer simultaneously and to be reflected from said meter face and said pointer onto said phototransistor whereby a signal is generated indicative of said reflected radiation and hence indicative of the position of said pointer;

wherein the means to pulse said light emitting diode is a buffer amplifier feeding said light emitting diode the information which said phototransistor sees, causing the system to regenerate and oscillate until the reflect light to said phototransistor is obscured by said pointer, at which time the oscillation ceases;

and containing in addition a bootstrap amplifier for the signal generated by said phototransistor whereby the sensing circuit is rendered insensitive to ambient light, but remains capable of seeing said reflected radiation of said light emitting diode.

2. The apparatus of claim 1 including in addition a reference light emitting diode positioned at the set point of said pointer and aimed at said phototransistor, said reference diode being oriented in such a manner that light from said diode does not fall on and is not reflected by said meter face and said meter pointer;
- means for alternately pulsing said first light emitting diode and said reference light emitting diode so as to cause radiation from said light emitting diode to fall on said meter face and said pointer and to be reflected from said meter face and said pointer onto said phototransistor whereby said phototransistor generates an output signal which is indicative of said reflected radiation and hence is indicative of the position of said pointer and so as to cause radiation from said reference light emitting diode to fall directly on said phototransistor whereby another signal is generated indicative of a reference level of radiation.

3. The apparatus of claim 1 including in addition, means operatively associated therewith to control a device which is being monitored by said meter.

4. A system adapted to be used in conjunction with a meter having a pointer and which detects the presence or absence of the pointer at some set point of the region normally traversed by the pointer during the operation of the meter, said system being operative independently of the operation of said meter and not affecting the same, said system comprising in combination: a meter including a meter face, a pointer mounted for movement across said meter face and detecting means including means to detect the presence or absence of said pointer at some set point along the path traversed by said pointer as it traverses said meter face, said detecting means comprising:
- two light emitting diodes wherein the first light emitting diode is positioned adjacent to said meter face and to one side of the set point position of said pointer and intermediate of the ends of said pointer;
- and the second light emitting diode is positioned adjacent to the first light emitting diode but on the side of the set point opposite to that at which the first light emitting diode is positioned;
- a phototransistor positioned adjacent to said meter in a plane which includes the line which defines the set point position of said pointer;
- means for pulsing said first light emitting diode so as to cause radiation from said light emitting diode to fall on said meter face and said pointer simultaneously and to be reflected from said meter face and said pointer onto said phototransistor, and
- means for pulsing said second light emitting diode together with said first light emitting diode, whereby radiation from said light emitting diodes falls on said meter face and said pointer simultaneously and is reflected from said meter face and said pointer onto said phototransistor, whereby said phototransistor generates an output signal indicative of said reflected radiation and hence indicative of the position of the pointer and of the condition displayed on the meter; and
- wherein the means to pulse said light emitting diodes is a buffer amplifier which feeds both of the said light emitting diodes the information which said phototransistor sees, causing the circuit to regenerate and oscillate until the reflected light reaching said phototransistor is obscured by the pointer and containing in addition a bootstrap amplifier for the signal generated by said phototransistor whereby the sensing circuit is rendered insensitive to ambient light, but remains capable of seeing said reflected radiation of said light emitting diode.

5. The apparatus of claim 1 wherein said second light emitting diode is positioned adjacent to the first light emitting diode but on the side of the set point opposite to that at which the first light emitting diode is positioned;
- a reference light emitting diode positioned at the set point of said pointer and aimed at said phototransistor, said reference diode being oriented in such a manner that light from said diode does not fall on and is not reflected by said meter face and said meter pointer;
- means for pulsing all three of said light emitting diodes whereby light from said first and second light emitting diodes is caused to fall simultaneously on said meter face and said pointer and to be reflected from said meter face and said pointer onto said phototransistor whereby said phototransistor generates a signal indicative of said reflected radiation and hence indicative of the position of said pointer and alternately the light from said reference light emitting diode is caused to fall directly onto said phototransistor whereby said phototransistor generates a further signal indicative of a desired reference level of radiation.

6. The apparatus of claim 4 including in addition, means operatively associated therewith to control a device which is being monitored by said meter.

7. A system adapted to be used in conjunction with a meter having a pointer and which detects the presence or absence of the pointer at some set point of the region normally traversed by the pointer during the operation of the meter, said system being operative independently of the operation of said meter and not affecting the same, said system comprising in combination: a meter including a meter face, a pointer mounted for movement across said meter face and detecting means including means to detect the presence or absence of said pointer at some set point along the path traversed by said pointer as it traverses said meter face, said detecting means comprising:
- two light emitting diodes, the first of said light emitting diodes being positioned adjacent to said meter face and to one side of the set point position of said pointer and intermediate of the ends of said pointer and the second light emitting diode being positioned adjacent to the first light emitting diode but on the side of the set point opposite to that at which the first light emitting diode is positioned;
- a phototransistor positioned adjacent to said meter in a plane which includes the line which defines the set point position of said pointer;
- means for pulsing said first light emitting diode and said second light emitting diode so as to cause radiation from said light emitting diodes to fall on said meter face and said pointer simultaneously and to be reflected from said meter face and said pointer simultaneously onto said phototransistor, whereby said phototransistor generates an output signal indicative of said reflected radiation and hence indicative of the position of the pointer and of the condition displayed on the meter; and
- wherein the means to pulse said light emitting diodes is two buffer amplifiers each feeding one said light emitting diode, only one at a time, the information which said phototransistor sees, whereby one of said light emitting diodes is powered until the pointer interrupts the reflected light reaching said phototransistor, at which time the powered light emitting diode is turned off and the other of said light emitting diodes is turned on, which causes the circuit to regenerate and oscillate except for the instant of time when the reflected light is interrupted from reaching said phototransistor and the circuit switches to the opposite light emitting diode, and containing in addition a bootstrap amplifier for the signal generated by said phototransistor whereby the sensing circuit is rendered insensitive to ambient light, but remains capable of seeing said reflected radiation of said light emitting diode.

8. The apparatus of claim 7 including in addition, means operatively associated therewith to control a device which is being monitored by said meter.

9. A system adapted to be used in conjunction with a meter having a pointer and which detects the presence or absence of the pointer at some set point of the region normally traversed by the pointer during the operation of the meter, said system being operative independently of the operation of said meter and not affecting the same, said system comprising in combination: a meter including a meter face, a pointer mounted for movement across said meter face and detecting means including means to detect the presence or absence of said pointer at some set point along the path traversed by said pointer as it traverses said meter face, said detecting means comprising:

at least one and not more than two light emitting diodes positioned adjacent to said meter face and to one side of the set point position of said pointer and intermediate of the ends of said pointer;

a phototransistor positioned adjacent to said meter in a plane which includes the line which defines the set point position of said pointer;

means for pulsing said first light emitting diode so as to cause radiation from said light emitting diode to fall on said meter face and said pointer simultaneously and to be reflected from said meter face and said pointer onto said phototransistor whereby a signal is generated indicative of said reflected radiation and hence indicative of the position of said pointer; and including in addition a boot strap circuit incorporating said phototransistor to improve ambient background discrimination and desired signal sensitivity.

10. A system adapted to be used in conjunction with a meter having a pointer and which detects the presence or absence of the pointer at some set point of the region normally traversed by the pointer during the operation of the meter, said system being operative independently of the operation of said meter and not affecting the same, said system comprising in combination: a meter including a meter face, a pointer mounted for movement across said meter face and detecting means including means to detect the presence or absence of said pointer at some set point along the path traversed by said pointer as it traverses said meter face, said detecting means comprising:

two light emitting diodes, the first of said light emitting diodes being positioned adjacent to said meter face and to one side of the set point position of said pointer and intermediate of the ends of said pointer and the second light emitting diode being positioned adjacent to the first light emitting diode but on the side of the set point opposite to that at which the first light emitting diode is positioned;

a phototransistor positioned adjacent to said meter in a plane which includes the line which defines the set point position of said pointer;

means for pulsing said first light emitting diode and said second light emitting diode so as to cause radiation from said light emitting diodes to fall on said meter face and said pointer simltaneously and to be reflected from said meter face and said pointer simultaneously onto said phototransistor, whereby said phototransistor generates an output signal indicative of said reflected radiation and hence indicative of the position of the pointer and of the conditions displayed on the meter; and including in addition a boot strap circuit incorporating said phototransistor to improve the ambient background discrimination and desired signal sensitivity.

11. A system adapted to be used in conjunction with a meter having a pointer and which detects the presence or absence of the pointer at some set point of the region normally traversed by the pointer during the operation of the meter, said system being operative independently of the operation of said meter and not affecting the same, said system comprising in combination: a meter including a meter face, a pointer mounted for movement across said meter face and a regenerative positive feedback means to detect the presence or absence of said pointer at some set point along the part traversed as it traverses said meter face, in combination with a detecting means, in which said detecting means comprises an optical and electrical feedback means including:

at least one light emitting diode but not more than two adjacent to said meter face and an opposite sides of the set point position of said pointer and intermediate of said pointer;

a phototransistor positioned adjacent to said meter in a place which includes the line which defines the set point position of said pointer;

a unity gain bootstrap amplifying circuit which incorporates said phototransistor, thus making the regenerative positive feedback electrical circuit immune to ambient light but still capable of seeing the reflected radiation of the said light emitting diode; and at least one means for powering the light emitting diodes comprising a buffer amplifier for each light emitting diode providing positive feedback through regeneration to a sensing circuit by means of the optical power supplied by the combination of the light emitting diodes and the phototransistor which causes the circuit to oscillate when the said phototransistor sees any one of the light emitting diodes.

* * * * *